United States Patent [19]

Petersen

[11] Patent Number: 5,295,896
[45] Date of Patent: Mar. 22, 1994

[54] BONE-CUTTING MEAT-RECOVERING UNIT

[76] Inventor: Ronald A. Petersen, 802-20th St. SW., Austin, Minn. 55912

[21] Appl. No.: 966,532

[22] Filed: Nov. 10, 1992

[51] Int. Cl.$^5$ ............................................. A22C 17/00
[52] U.S. Cl. ................................... 452/135; 452/171; 83/810
[58] Field of Search ............... 452/171, 135, 136, 149, 452/160, 170; 30/380; 83/788, 809, 810

[56] References Cited

U.S. PATENT DOCUMENTS

| | | | |
|---|---|---|---|
| 2,827,085 | 3/1958 | Ocenasek | 83/810 |
| 2,903,027 | 9/1959 | Edgemond, Jr. et al. | 83/810 |
| 3,546,737 | 12/1970 | Neebel et al. | 452/171 |
| 3,789,456 | 2/1974 | Doerfer et al. | 452/171 |
| 3,913,436 | 10/1975 | Orescan | 83/810 |
| 3,982,299 | 9/1976 | Kompan | 452/171 |
| 4,134,181 | 1/1979 | Schneider Jr. | 452/171 |

Primary Examiner—Willis Little
Attorney, Agent, or Firm—Schroeder & Siegfried

[57] ABSTRACT

A bone-cutting meat recovery unit having a platform tilted off horizontal with an elongated channel formed in its upper surface and a vertically extending powered band saw running through the platform immediately adjacent the channel at an angle thereto of approximately 30°, and a powered continuous drive chain revolvably mounted directly above the channel and having teeth to engage racks of bones placed with their spinal columns extending longitudinally within the channel and drive the same past the powered band saw. The channel has sidewalls one of which is adjacent to the band saw and extends upwardly and outwardly from the bottom of the channel and is contoured with vertically spaced steps extending longitudinally of the channel to cause the featherbones carried by such a rack of bones to extend at an angle to the upper surface, and thereby cause the saw to cut the featherbones at an acute angle and undercut the same so as to sever a substantially greater portion of the strip of meat disposed beneath the featherbones immediately adjacent and along the spinal column. A new method of recovering an additional and major portion of the recoverable meat is also disclosed.

18 Claims, 7 Drawing Sheets

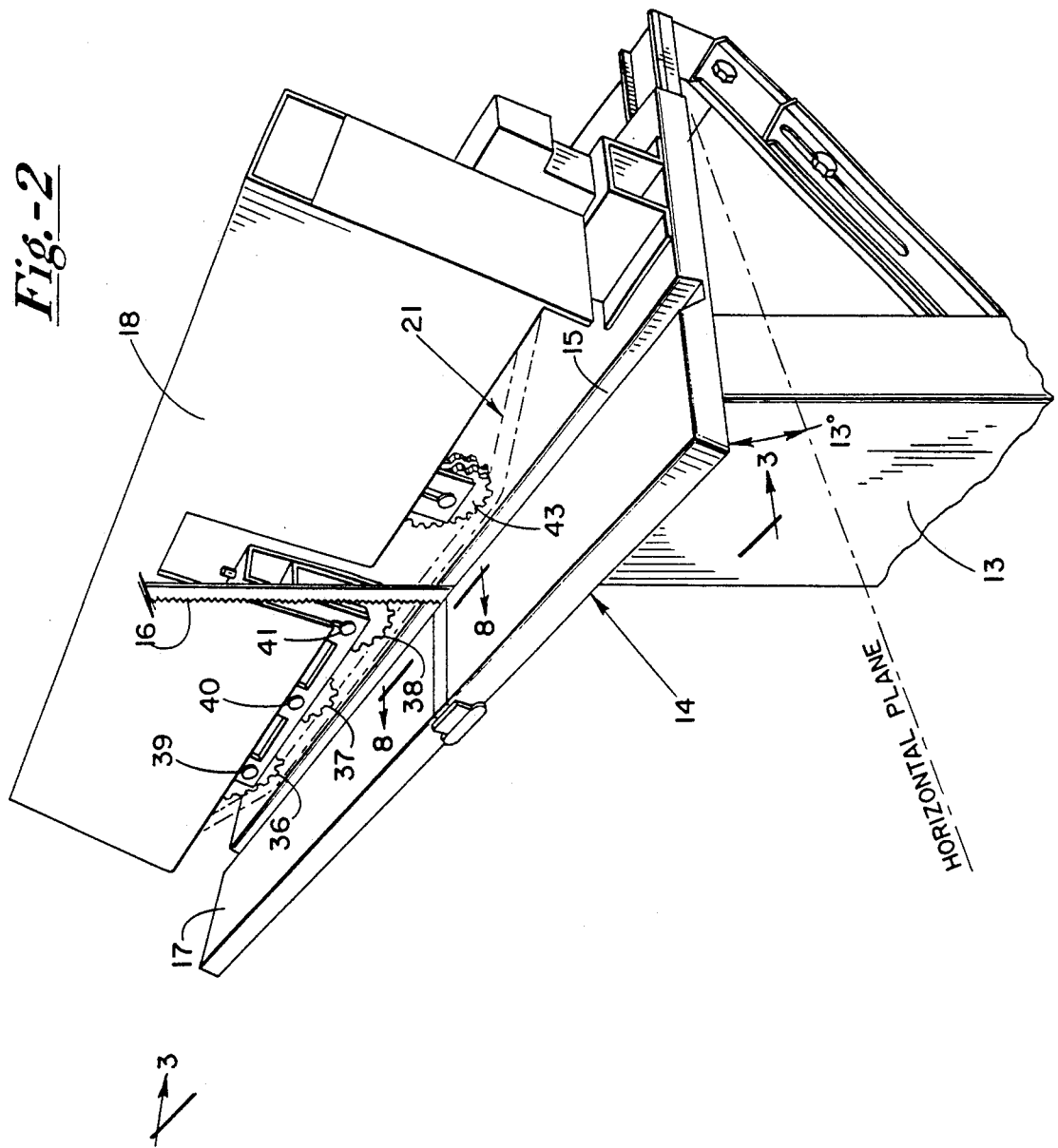

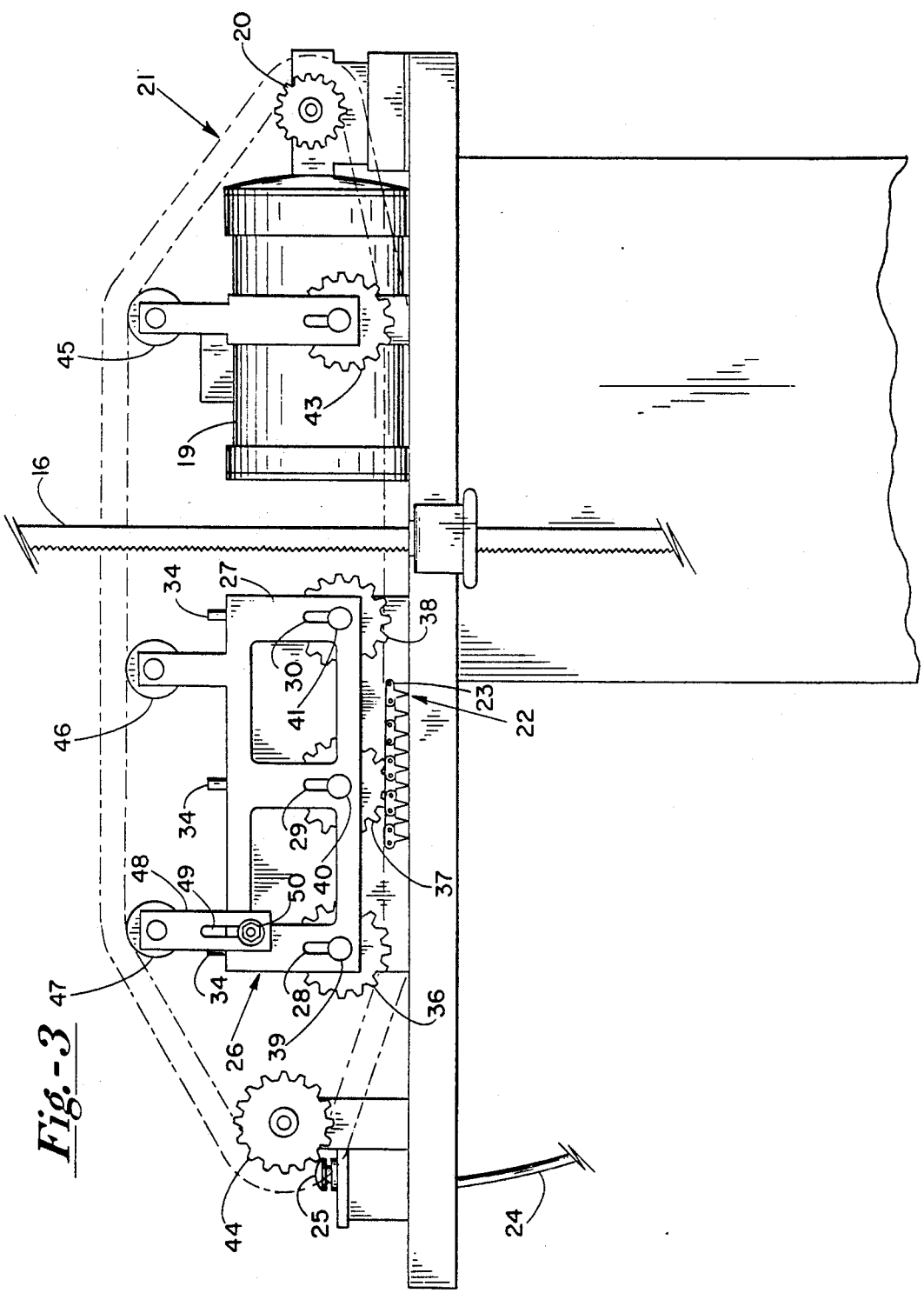

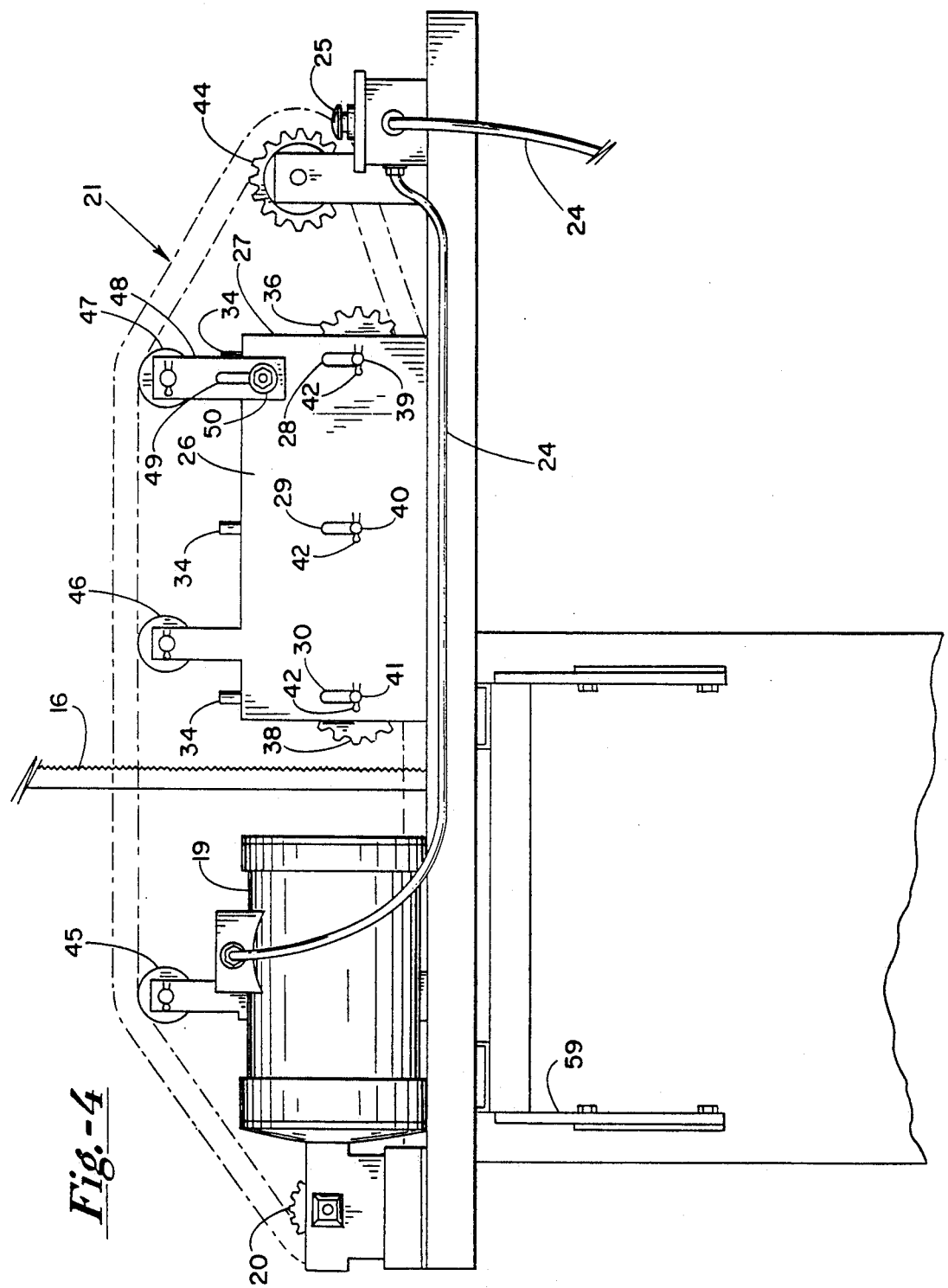

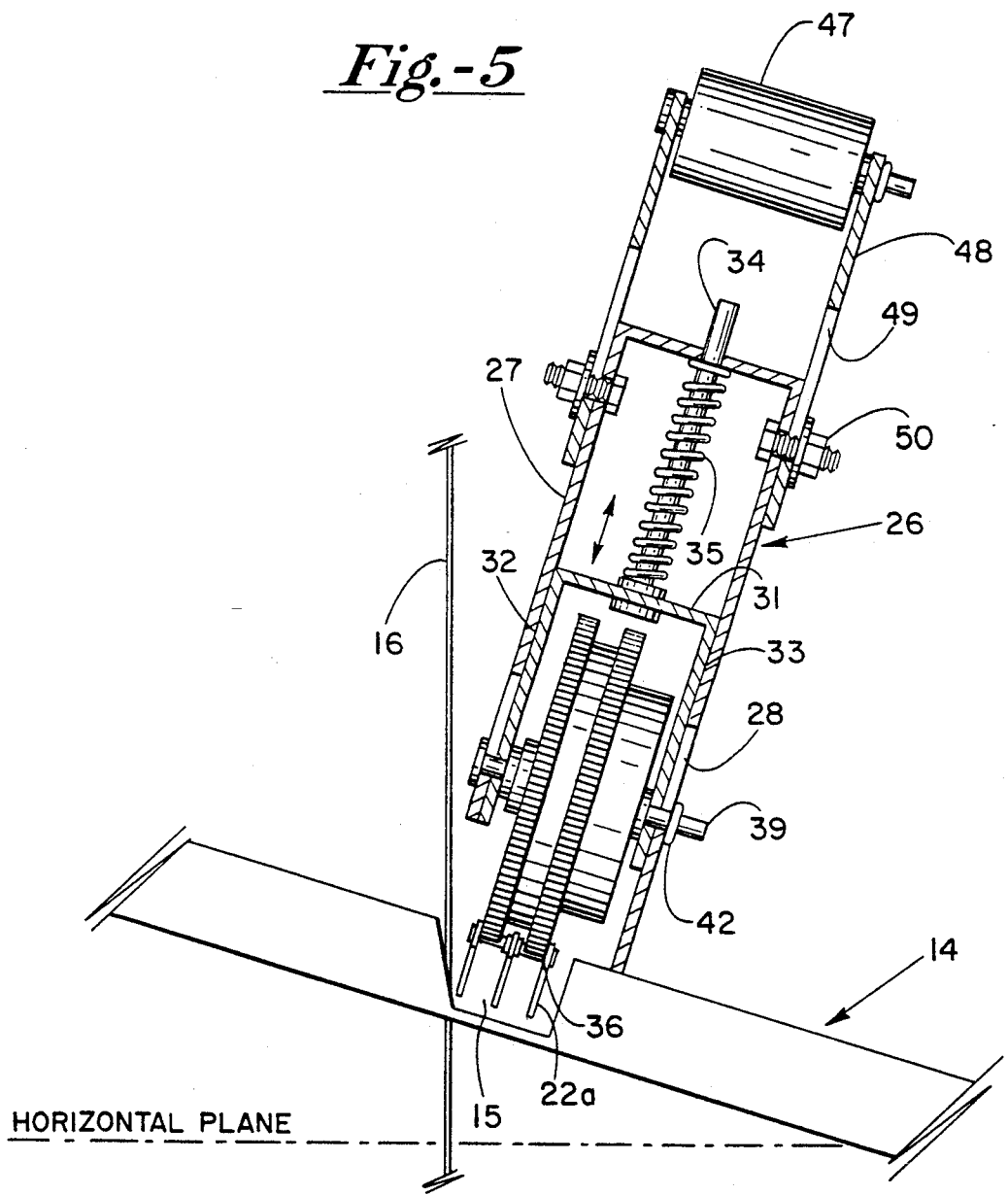

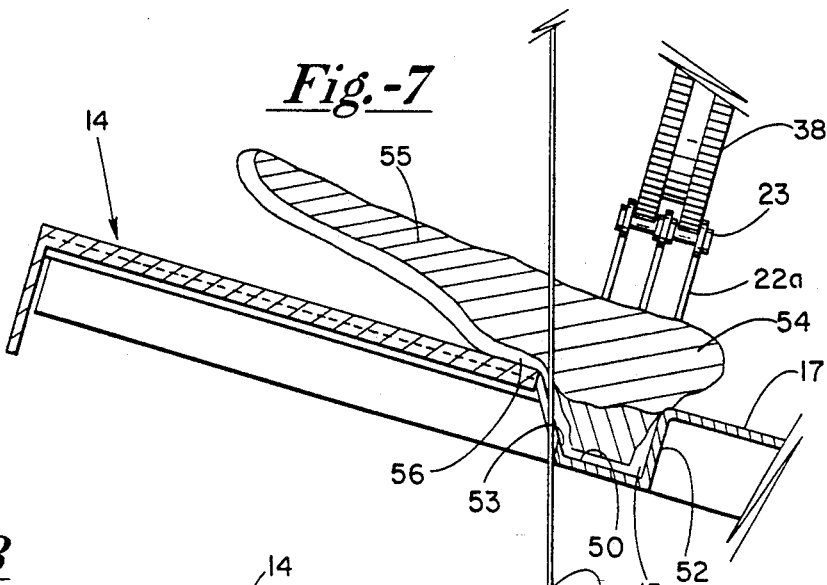
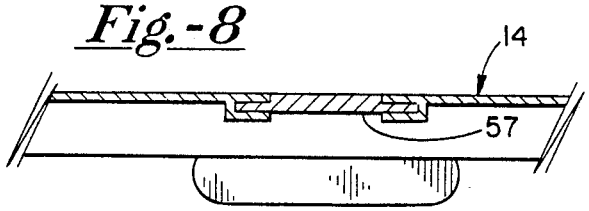
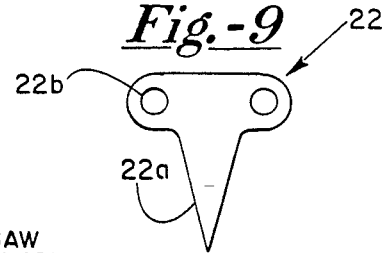
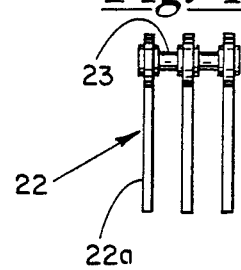
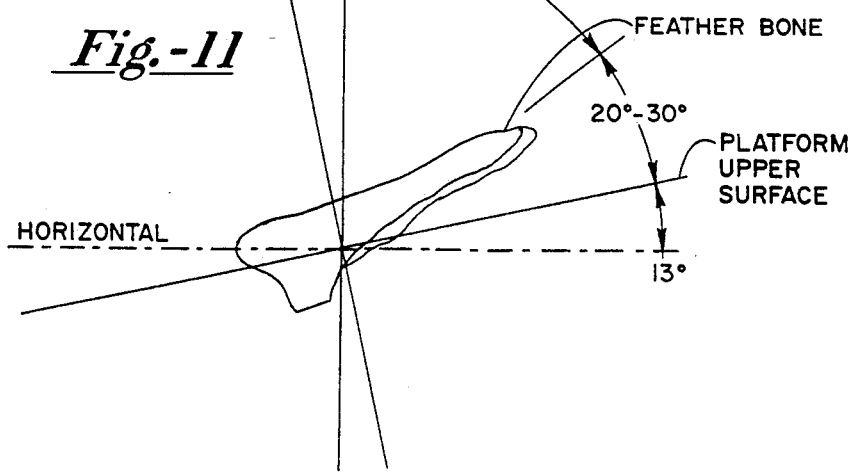

BONE-CUTTING MEAT-RECOVERING UNIT

BACKGROUND OF THE INVENTION

Many animals, particularly hogs, have a strip of valuable meat extending along their spinal column where the featherbones extend outwardly therefrom. Substantial manual labor has been required in the past in order to recover that strip of meat. Portions thereof have previously been recovered by placing the split spinal column, with its back rib removed, upon a flat horizontal table having a band saw running vertically therethrough. The spinal column, with the flat side of the featherbones down, is then guided manually across the flat table along a line such that the saw will sever the featherbones along the spinal column. In doing so, however, a very substantial portion of the strip of meat lying alongside the spinal column is missed and is not recovered because it thereafter moves with the spinal column, for processing into fertilizer and the like.

Not all spinal columns have featherbones. Under the prior art practices, such spinal columns were not sawed, because of danger to the employee's hands. As a consequence, the entire strip of meat extending along the spinal column was lost, since it remained attached to the spinal column, which is converted into fertilizer.

The above procedures are not only dangerous, they are costly because of the substantial loss of meat. In addition two (2) men are required, one to present the racks of bones to the platform and the other to feed the rack of bones past the saw, and to move the severed pieces beyond and away from the saw. Thus, there is a need for a better method of recovering the meat so as to increase the yield and to reduce the man-power requirements. I have provided an improved method of recovering such meat, and a simple but effective machine for practicing same.

BRIEF SUMMARY OF THE INVENTION

The goal of the meat-packing industry is to save as much as possible of the strip of meat which lies along the spinal column, behind and beneath the featherbones when the latter is lying with its flat side up. This strip of meat also surrounds the button bones which extend along the spinal column between the latter and the featherbones. It is this strip of meat much of which is generally lost and the major portion of which I recover through the use of my meat-recovery unit described hereinafter.

Not all spinal columns have featherbones, but they do have a line of button bones positioned there along and a strip of meat extending there along, as described above. By cutting the featherbones from above at an angle and with the flat side up, so as to undercut them and thereby cut off a portion of the spinal column and of the button bones, I am successful in also cutting off the major portion of the strip of lean meat referred to above, and thereby retrieving same.

By designing my meat-recovery machine as I have done, it is possible to saw all spinal columns without danger so as to retrieve the strip of meat described above, whether they have featherbones or not. All spinal columns are moved through my machine, and the cut is made through the button bones and side of the spinal column, whereby the major portion of the surrounding strip of meat is recovered. I have found that a major savings can be effected in this manner.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which:

FIG. 2 is a perspective view of my bone-cutting meat-recovery unit taken from the rear and right hand side and showing the gear and chain protective casing;

FIG. 3 is a right side elevational view of the unit shown in FIG. 2, with the protective casing removed;

FIG. 4 is a left side elevational view of the unit shown in FIG. 2, with the protective casing removed;

FIG. 5 is a fragmentary detailed view, on an enlarged scale, of one of the three depressing rollers mounted directly above the lower rung of the progressor chain and adjacent the band saw;

FIG. 7 is a fragmentary vertical sectional view taken through the platform just ahead of the saw and illustrating the manner in which the spinal column and featherbones are oriented during the sawing-meat-retrieving operation;

FIG. 8 is a fragmentary vertical sectional view taken along line 8—8 of FIG. 2;

FIG. 9 is a side elevational view of one of the links of the progressor-chain;

FIG. 10 is a front elevational view of the link shown in FIG. 9; and

FIG. 11 is a diagramatic view illustrating the angular relationships between the platform, a horizontal plane, and the vertical band saw, as well as the orientation of the featherbones during the bone-sawing operation.

DETAILED DESCRIPTION OF THE INVENTION

Figure 1A:
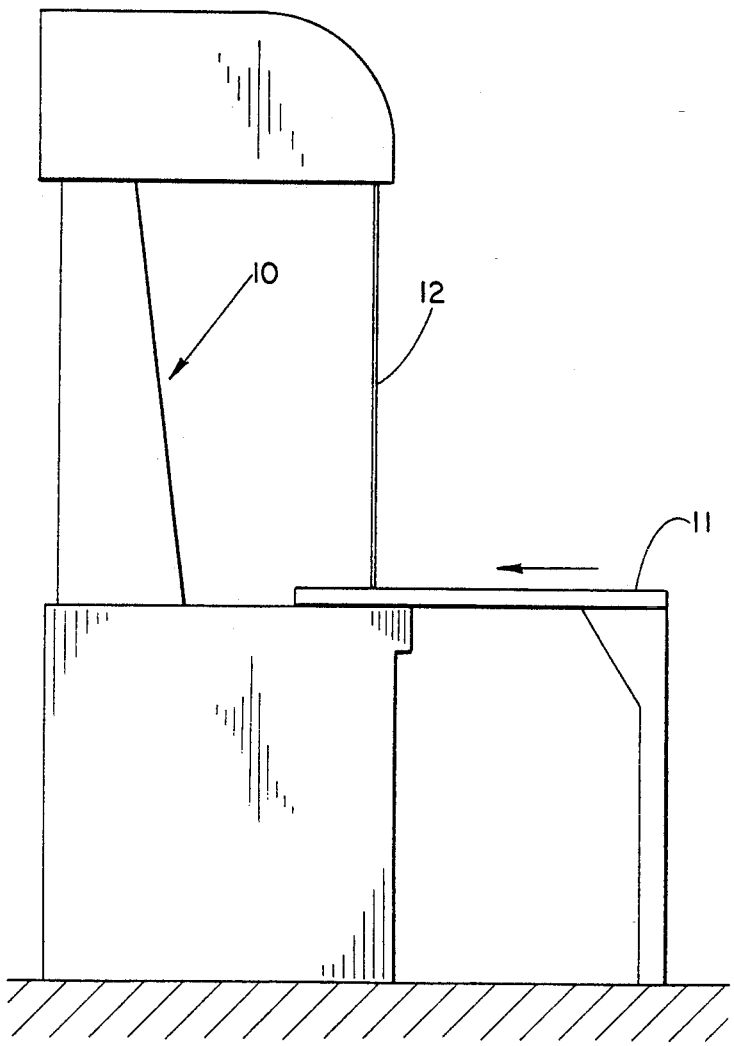
FIG. 1A is a diagrammatic view of prior art, illustrating machines previously utilized in meat packing plants in an effort to retrieve the featherbones extending along the spinal columns of hogs and the meat associated therewith.

FIG. 1A is a diagramatic view of the prior art utilized heretofore in severing the featherbones from the spinal column. As shown, it is comprised of an upright frame 10 having a horizontal platform 11 through which a continuous powered band saw 12 passes. In use, the spinal column and its attached featherbones are placed upon the platform with the flat side of the featherbones down and the spinal column is moved manually past the saw 12, so that the latter cuts the featherbones free of the spinal column along a line parallel to the longitudinal center of the spinal column and approximately at the point were the featherbones extend laterally from the spinal column.

Figure 1B:
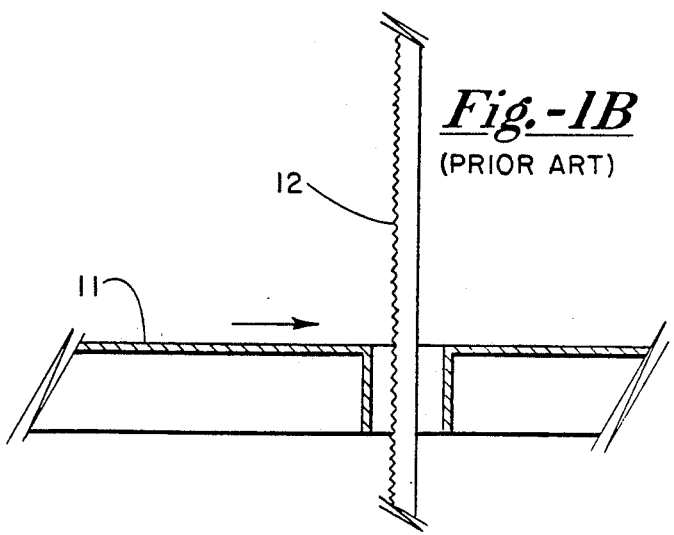
FIG. 1B is a fragmentary vertical sectional view taken through the feeding table of the machine illustrated in FIG. 1 at the point where the band saw moves through the table and does the cutting.

FIG. 1B is a fragmentary vertical sectional view taken through the platform at the area where the band saw 12 moves through the platform and looking at the band saw from the right-hand side. The spinal columns and attached featherbones are moved in the direction of the arrows in each of FIGS. 1A and 1B.

FIG. 2 is a perspective view of my bone-cutting meat-recovering unit, looking at it from the rear and right-hand side. As shown, it includes a rigid frame 13 which pivotally supports an elongated platform 14, which has a channel 15 extending longitudinally thereof. A continous powered band saw 16 is oriented vertically and extends downwardly through the platform 14 in an opening provided for that purpose immediately adjacent the channel 15, so as to extend into the interior of the channel. As shown, the platform 14 is tilted approximately 13° off of the horizontal plane, so that the band saw 16 extends approximately 13° off a line drawn vertically relative to the upper surface 17 of the platform 14. A protective casing 18, which encases the spinal column progressing unit is shown in its protective position.

FIG. 3 illustrates the details of the spinal column progressing unit, the protective casing 18 having been removed therefrom. As shown in FIG. 3, it is viewed as a side elevation from the right-hand side. It includes an electric motor 19 having a drive sprocket 20, which positively drives a continuous chain unit 21. The latter functions to engage the spinal column of the rack of bones as it is presented to the unit by the operator, with the spinal column positioned within and extending longitudinally of the channel 15. FIG. 7 and FIG. 5 illustrate the manner in which the spinal column is positioned within the channel 15 and its orientation relative to the powered band saw 16.

The continuous chain 21 is made up of a plurality of links 22, which are best shown in FIGS. 9 and 10. Each of the links is provided with a spinal-column-engaging tooth 22a and a pair of openings 22b, through which a pin 23 extends to connect each link to its adjacent link. As best shown in FIG. 3, the individual teeth 22a extend outwardly and positively engage the upper surface of the spinal column.

FIG. 4 shows the side of the bone-cutting meat-recovering unit opposite to that shown in FIG. 3. As shown, power is provided to the motor 19 by the electric cord 24. A kill switch 25 is interposed within the cord 24 to enable the operator to quickly arrest the movement of the spinal column progressing unit.

Referring again to FIG. 3, there is shown a depressing mechanism indicated generally as 26 for pressing the spinal column of the rack of bones downwardly into the lower level of the channel 15 and moving the same longitudinally thereof into engagement with the continously powered band saw 16. Fixedly mounted upon the upper surface of the platform 14 is an elongated mounting frame 27 which is generally U-shaped in cross-section, as best shown in FIG. 5. As shown, the frame 27 is generally rectangular and has opposing vertical walls in each of which is formed three (3) pair of oppositely located slots 28, 29, and 30. Mounted between the vertical walls of the mounting frame 27, opposite and within each of the slots 28-30, inclusive, is a yoke member 31 which is also best seen in FIG. 5. This yoke member has a pair of opposite depending legs 32 and 33, as well as a stem 34 which extends upwardly through the upper horizontal wall of the mounting frame 26. The yoke 31 is in each instance urged downwardly by a coiled compression spring 35, which surrounds the peg 34. Thus, the yoke 31 is constantly urged downwardly by the spring 35.

Rotatably mounted in the lower portions of the two (2) legs 32 and 33 of the yoke 31 is, in each instance, a depressing sprocket, such as indicated in FIG. 3 by the numeral 36-38, inclusive. The teeth of these individual sprockets extend downwardly into the links 22 of the continuous chain 21 and serve to press the teeth 22a of the links 22 downwardly towards the bottom of the channel 15. In so doing, they cause the teeth 22a to firmly grip the spinal column and move the same rearwardly toward and past the powered band saw 16. As shown, the individual depressing sprockets 36-38 are each mounted within one of the slots 28-30 by means of one of three pins 39-41, inclusive, which extends through one of the slots 28-30 and is secured by a cotter pin, such as 42. A similarly mounted depressing sprocket 43 is mounted in the same manner upon the platform 14 opposite the motor 19 and directly above the channel, and serves to maintain the claim 21 and its teeth 22a in engagement with the upper surface of the spinal column. When there are no spinal columns within the channel 15, the chain 21 extends downwardly into the channel.

Rotatably mounted upon the platform 14 at the end of the platform 14 opposite the drive sprocket 20 is a free-traveling sprocket 44.

Rotatably mounted upon the upper surface of the motor 19 is a roller 45. A similar roller 46 is rotatably mounted upon the upper surface of the mounting frame 26. A similar roller 47 is rotatably mounted upon the upper end of a plate 48, which has a slot 49 designed to cooperate with a spring bolt and nut 50 to adjust the vertical position of the roller 47 relative to the chain 21. By adjusting the height of the roller 47, the chain 21 can be loosened or tightened as desired.

As best shown in FIG. 7, the channel 15 has a bottom wall 50, which extends parallel to the upper surface 17 of the platform 14. It also has a side wall 52 which extends perpendicular to the bottom wall 50 and a second sidewall 53 which slopes upwardly and outwardly from the bottom wall 50 until it meets the upper surface 17 at which it defines a guiding line running the length of the channel 15. Thus, the channel 15 is contoured in cross-section to effect an elevation of the featherbones which are carried by the spinal column of the rack of bones. Such a rack is shown in FIG. 7, the spinal column being identified by the numeral 54, the featherbones by the numeral 55, and the meat or flesh portion by the numeral 56. As shown, when the rack of bones is placed upon the platform 14 with the flat side of the featherbone 55 facing upwardly, and the depressing rollers 36-38 and 43 forcing the spinal column 54 downwardly into the channel as far as it can go, the featherbones 55 are tilted upwardly at an acute angle to the upper surface 17 of the platform 14. This induced orientation relative to the upper surface 17, plus the 13° offset of the powered band saw 16, relative to a plane vertical to the upper surface 17, causes the power saw 16 to engage and saw the featherbones along a line of cut, which is approximately 45°-55° off the plane of the featherbones. This provides an undercut at the underside of the featherbones and immediately adjacent or slightly into the spinal column 54, so as to cut through the button bones and retrieve the maximum amount of the strip of meat which extends along the spinal column beneath and inwardly of the featherbone.

FIG. 8 is a fragmentary sectional view taken along line 8—8 of FIG. 2 and shows a sliding section 57 of the platform 14 which is necessary in order to remove the powered band saw 16 for cleaning and repair purposes. It also permits the platform 14 to be adjustably tilted as will be hereinafter described.

Figure 6:
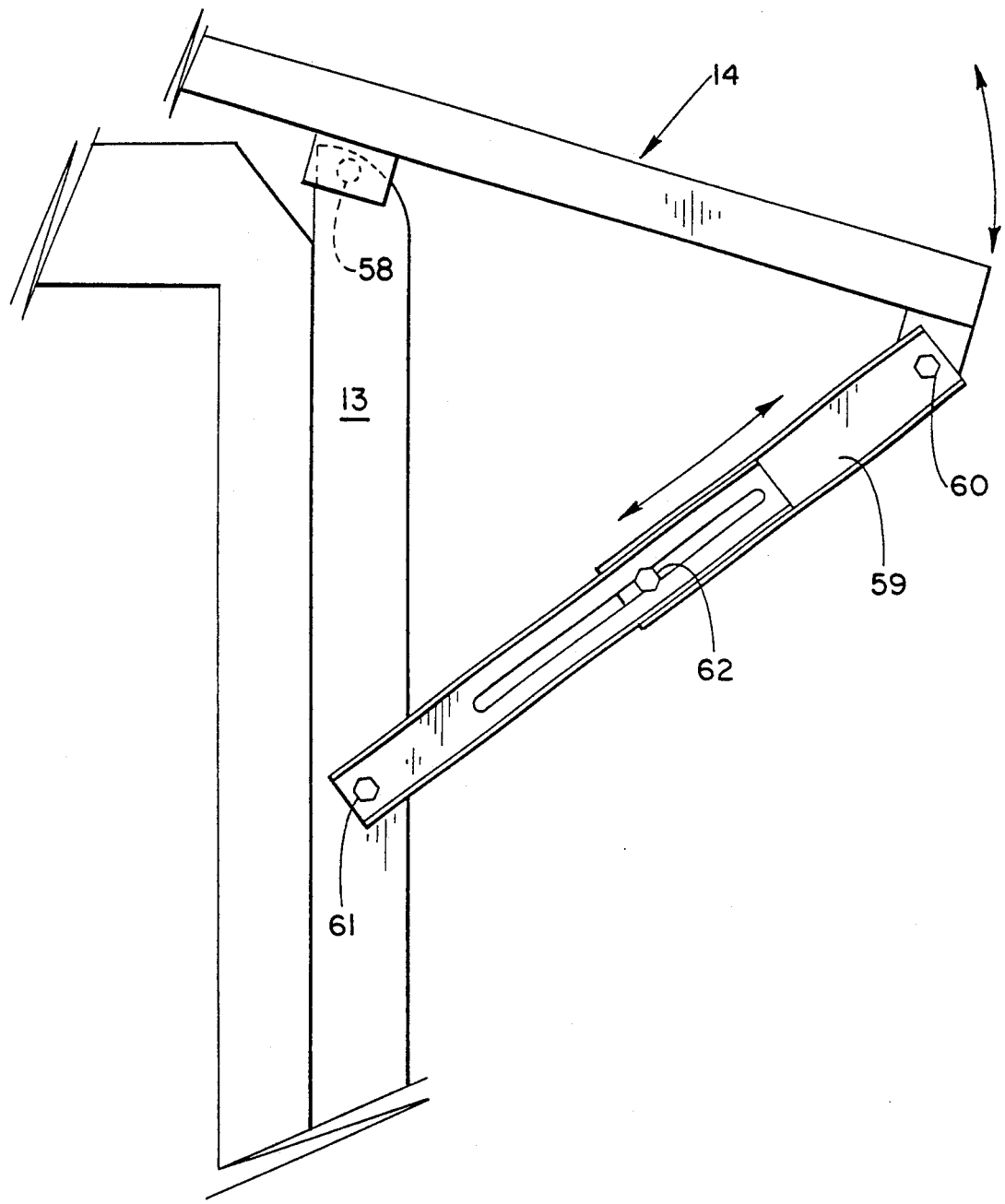
FIG. 6 is a fragmentary front elevational view of the tilt-adjustment mechanism of the tilted platform.

FIG. 6 illustrates how the platform 14 can be suitably adjusted relative to the frame 13. As shown, it is pivotally mounted at the upper end of the frame 13 as at 58. Extendable arm 59 is pivotally connected to one side edge of the platform 14 as at 60. At its opposite end the arm 59 is pivotally connected as at 61 to the frame 13. Securing means 62 extends through registering slots formed in each of the two sections of the arm 59, so as to fix the two against longitudinal relative movement once the platform 14 has been tilted to the desired angulation relative to the frame 13.

In use, the single operator which is required to operate this unit, presents the individual spinal columns of the various racks of bones to the progressing mechanism by sliding the spinal column forwardly to the right as viewed in FIG. 3 within the channel 15. The teeth 22a of the chain 21 engage the spinal column and urge the same downwardly into the bottom area of the channel 15 and continue to press the same downwardly thereinto until after it has passed the powered band saw 16. The saw 16, which extends at a substantial angle to the upper surface 17 of the platform 14, and at an even greater angle to the plane of the featherbones 55, severs the featherbones immediately adjacent the spinal column as shown in FIG. 7 and undercuts the same so as to engage and sever the strip of meat underlying the featherbones which would otherwise be lost if the cut were made at right angles to the length of the featherbones. As best shown in FIG. 7, the featherbones are tilted as a result of the pressure brought to bear upon the upper surface of the spinal column and the shape of the channel within which the spinal column is disposed and progressed.

I have found that I can increase the reclaimed lean meat through the use of this, bone-cutting meat-recovering unit to 0.433 pounds per average rack of bones, which is passed therethrough. This is in sharp contrast to the average weight of 0.191 pounds per piece, which has been the average weight of reclaimed lean meat previously obtained from such racks of bones when the cuts were made as described hereinbefore as prior art. This is a substantial saving when it is realized that approximately 700 loins are boned per hour, which means that in the 7¾ hour day 5,425 pieces or loins are boned. Such trimmings are sold at approximately $0.50 per pound, which means that through the use of my bone-cutting meat-recovering unit, the meat packer can recover approximately $1,175.00 worth of lean meat per day. This is in contrast to a recovery which has heretofore been effected through the use of the prior art as hereinbefore described, which enables the packer to reclaim approximately $518.00 of recovered lean meat each day. Thus, we can effect a net daily savings through the use of this machine of approximately $655.00 each day.

FIG. 11 is a diagramatic view illustrating the angulation of the platform and the relative positions of the featherbones as they are being cut by the saw blade. It will be seen therefrom that the platform is tilted at an angle of approximately 10°-20° off horizontal. The prototype of the machine shown herein has the platform tilted at 13°. The degree of tilt can be adjusted as will be readily understood by reference to FIG. 6 and the description thereof.

Since the saw blade 16 extends vertically, it is clear that in the prototype machine the platform is 77° off the vertical orientation of the blade. It has been found that when the depressing sprockets 36-38, inclusive, bear down upon the spinal column, and as a consequence the spinal column is pressed downwardly to the bottom of the channel, the featherbones engage the right-hand edge of the platform sidewall of the channel and the featherbones are caused to be elevated approximately 20°-30° relative to the upper surface of the platform. Thus, the featherbones extend at an angle of approximately 45°-55° relative to the saw blade. As a consequence, there is a substantial undercut by the saw blade with a net result that the meat beneath the featherbones is severed and retrieved.

It will, of course, be understood that various changes may be made in the form, details, arrangement and proportions of the parts without departing from the scope of the invention which comprises the matter shown and described herein and set forth in the appended claims.

I claim:
1. A bone-cutting meat-recovery unit comprising:
 (a) a support having an upper surface constructed and arranged to support a rack of bones having an elongated spinal column with a strip of recoverable meat extending therealong;
 (b) an elongated bone-guide mechanism fixedly located along said upper surface of said support and constructed and arranged to receive the spinal column of such a rack of bones longitudinally therealong and against which such a rack of bones may be guided into a cutting mechanism while supported by said upper surface in elevated relation thereto at an acute angle relative to the latter, said mechanism defining a guide-line along which such a rack of bones may be guided thereby into such a cutting mechanism; and
 (c) a powered cutting member disposed within said guide mechanism and extending immediately above said upper surface and defining a vertical cutting line in position to engage and sever the recoverable meat-bearing portions of such a rack of bones, the cut being along a line extending downwardly and inwardly from above the featherbones towards the spinal column at an angle relative to a plane extending vertically to said upper surface and longitudinally through and generally parallel to said guide mechanism, to thereby cut and recover the major portion of the strip of meat disposed adjacent to the spinal column and featherbones; said spinal column is moved along and against said guide mechanism, past said vertical cutting line.

2. The bone-cutting meat-recovery unit defined in claim 1, wherein the cut of said cutting member extends along a line extending downwardly adjacent and past said bone-guide mechanism.

3. A bone-cutting meat recovery unit comprising:
 (a) a support having an upper surface constructed and arranged to support a rack of bones having an elongated spinal column with a plurality of featherbones extending laterally outwardly therefrom with a strip of recoverable meat extending along the spinal column adjacent the juncture of the featherbones and the spinal column;
 (b) an elongated narrow channel carried by said upper surface of said support and constructed and arranged to receive and support the spinal column of such a rack of bones longitudinally therewithin with its attached featherbones extending laterally outwardly therefrom above said upper surface at an acute angle relative to the latter;

(c) a powered cutting member disposed adjacent said channel in position to engage and cut the featherbones from, and closely adjacent to, the spinal column of such a rack of bones so disposed within said channel as the rack of bones is moved along said channel past said cutting member;

(d) said channel having in cross-section a bottom and a pair of walls extending upwardly from opposite sides of said bottom;

(e) said cutting member having a line of cut along a plane extending adjacent one wall of said channel from a point at said upper surface of said support toward the longitudinal center of said channel; and (f) said channel wall adjacent said line of cut extending at an angle relative to the other of said walls and being constructed and arranged to supportingly engage, orient, and maintain such a rack of bones within said channel with its featherbones extending outwardly from said adjacent channel wall in elevated relation to said upper surface of said support.

4. A bone-cutting meat-recovery unit comprising:

(a) a platform tilted off horizontal having an upper surface for receiving and supporting thereon a rack of bones having an elongated spinal column with a plurality of featherbones extending laterally outwardly therefrom with a strip of recoverable meat extending along the spinal column adjacent the juncture of the featherbones and the spinal column;

(b) a substantially vertically extending band saw extending through said platform;

(c) an elongated channel disposed within said platform and having a bottom and a pair of sidewalls extending upwardly from said bottom to said upper surface;

(d) said band saw extending vertically through said channel adjacent one of said sidewalls;

(e) said channel sidewall adjacent said band saw extending upwardly and, outwardly from said channel bottom and being contoured to enable the spinal column of such a rack of bones to be received and supported longitudinally within said channel so as to cause its featherbones to extend laterally outwardly therefrom in elevated relation to said upper surface of said platform and at an acute angle relative to said upper surface; and (f) said band saw having a line of cut extending adjacent said contoured sidewall downwardly and inwardly from the plane of said upper surface toward the longitudinal center of said channel at an angle approximately 13° off normal relative to said upper surface, whereby said band saw will cut and recover the major portion of the strip of meat disposed adjacent to the spinal column and featherbones of such a rack of bones when the spinal column of the latter is progressed longitudinally within said channel past and in close proximity to said band saw, with its strip of recoverable meat disposed below the featherbones.

5. A bone-cutting meat-recovery unit comprising:

(a) a platform having an upper surface tilted approximately 10°–20° off horizontal for receiving and supporting thereon a rack of bones having an elongated spinal column supporting a plurality of featherbones extending laterally outwardly therefrom with a flat side and an opposite side at which a strip of recoverable meat extends along the spinal column adjacent the juncture of the featherbones and the spinal column;

(b) a generally vertically extending band saw extending through said platform at an angle of approximately 70°–80° relative thereto;

(c) an elongated channel disposed within said upper surface and extending past said band saw in close proximity thereto and having a bottom and a pair of sidewalls extending upwardly from said bottom to said upper surface;

(d) one of said sidewalls having a substantially planar surface extending adjacent said band saw and upwardly and outwardly from said channel bottom whereby said channel is adapted to receive such a rack of bones therein with its spinal column extending longitudinally within said channel and its featherbones extending outwardly from said planar surface with the strip of recoverable meat being disposed above and engaging said planar surface and with the featherbones extending upwardly and outwardly above said upper surface at an acute angle relative thereto; and (e) said band saw having a line of cut extending vertically through said channel adjacent said channel bottom whereby said band saw will cut and recover the major portion of the strip of meat disposed adjacent to the spinal column and featherbones of such a rack of bones when the spinal column of the latter is progressed longitudinally within said channel past and in close proximity to said band saw with its flat side up and with its strip of recoverable meat disposed below the featherbones.

6. The bone-cutting meat recovery unit defined in claim 5, wherein the degree of tilt off horizontal of said platform upper surface is adjustable.

7. The bone-cutting meat recovery unit defined in claim 5, wherein said band saw extends through said sidewall planar surface.

8. The bone-cutting meat-recovery unit defined in claim 5, wherein said band saw enters said channel from above adjacent said sidewall planar surface and extends inwardly from said upper surface toward the longitudinal center of said channel.

9. The bone-cutting meat recovery unit defined in claim 5, and (f) downwardly biased rotary depressing means mounted above said channel in position to ride upwardly over the spinal column of such a rack of bones as the spinal column progresses longitudinally within said channel past said band saw and urge the spinal column downwardly toward the bottom of the channel to thereby cause its featherbones to be tilted upwardly from said upper surface by said sidewall planar surface.

10. A bone-cutting meat-recovery unit comprising:

(a) a platform having an upper surface tilted approximately 10°–20° off horizontal for receiving and supporting thereon a rack of bones having an elongated spinal column supporting a plurality of featherbones extending laterally outwardly therefrom with a flat side and an opposite side at which a strip of recoverable meat extends along the spinal column adjacent the juncture of the featherbones and the spinal column;

(b) an elongated narrow channel disposed within said upper surface and having a bottom and a pair of sidewalls extending upwardly from said bottom to said upper surface;

(c) a powered cutting member disposed adjacent said channel in position to engage and cut the featherbones from, and closely adjacent to, the spinal column of such a rack of bones so disposed within said channel and having a line of cut extending at approximately 70°–80° relative to said upper surface;

(d) said cutting member having a line of cut extending vertically through said channel adjacent said channel bottom whereby said cutting member will cut and recover the major portion of the strip of meat disposed adjacent to the spinal column and featherbones of such a rack of bones when the spinal column of the latter is progressed longitudinally within said channel past and in close proximity to said cutting member with its flat side up and with the strip of recoverable meat disposed beneath the featherbones; and (e) downwardly biased depressing means mounted above said channel adjacent said powered cutting member in position to engage the spinal column of such a rack of bones as the latter is moved longitudinally within said channel past said cutting member and in so doing to depress said spinal column toward said bottom of said channel and thereby cause the featherbones of the rack of bones to swing upwardly about the longitudinal axis of its spinal column in elevated relation to said upper surface.

11. The bone-cutting meat-recovery unit defined in claim 10, wherein said depressing means is rotatably mounted above said channel adjacent said cutting member.

12. The bone-cutting meat-recovery unit defined in claim 10, and (f) powered continuous rotary bone-progressor means revolvably mounted above said channel in position to engage the spinal column of such a rack of bones and drive the same longitudinally within said channel past said cutting member with the featherbones and strip of recoverable meat thereof in position to be so cut from the spinal column immediately adjacent thereto.

13. The bone-cutting meat-recovery unit defined in claim 12, wherein said bone-progressor means includes a powered revolving continuous chain having upper and lower rungs each of which carries spinal-column-engaging elements thereon.

14. The bone-cutting meat-recovery unit defined in claim 13, wherein said bone-progressor means includes a plurality of downwardly biased rotors spaced longitudinally of said channel and engaging the lower rung of said continuous chain and urging the same and any bones thereunder downwardly into said channel.

15. The bone-cutting meat-recovery unit defined in claim 14, wherein said bone-progressing means includes a plurality of said downwardly biased rotors disposed ahead of said cutting member and at least one of said rotors is disposed immediately adjacent said cutting member.

16. A method of recovering meat from a rack of bones having an elongated spinal column with a plurality of attached featherbones extending laterally outwardly therefrom and having a flat side and a plurality of button bones extending along its spinal column adjacent the featherbones and having a strip of meat extending along the spinal column beneath the featherbones and along the button bones, consisting in:

(a) providing a powered cutting member capable of cutting featherbones along a straight generally vertical line; and (b) moving the spinal column of the rack of bones, horizontally past the cutting member along a generally flat surface in close proximity to the cutting line of the cutting member, with the featherbones attached thereto having the flat side up and extending at an angle off the line of cut of the cutting member, of approximately 45°–55° in position to be cut immediately adjacent the spinal column to thereby undercut the featherbones and button bones and effectively recover the major portion of the strip of meat beneath the featherbones.

17. The method defined in claim 16, and (c) providing a channelled flat surface extending around the powered cutting member at an angle relative thereto of about 77°, whereby the spinal column is supported by and moved along the flat surface with its featherbones extending at approximately a 45°–55° angle to the line of cut.

18. The method defined in claim 16, and (c) positioning an elongated spinal-column-receiving channel member immediately adjacent the cutting line of the cutting member; and (d) moving the spinal column with the featherbones attached thereto within and along the channel member past the cutting member, with the featherbones being presented and oriented relative to the channel member for severing immediately adjacent to the spinal column while extending at said angle of about 20°–30° relative to the channel member.

* * * * *